Feb. 6, 1934.   L. H. TOLHURST   1,945,926
METHOD OF AND APPARATUS FOR PRODUCING MOTION PICTURES
Filed Oct. 13, 1928.   3 Sheets-Sheet 1

INVENTOR:
Louis H. Tolhurst,
BY
ATTORNEY.

Feb. 6, 1934. L. H. TOLHURST 1,945,926
METHOD OF AND APPARATUS FOR PRODUCING MOTION PICTURES
Filed Oct. 13, 1928 3 Sheets-Sheet 2

INVENTOR:
Louis H. Tolhurst,
By
ATTORNEY.

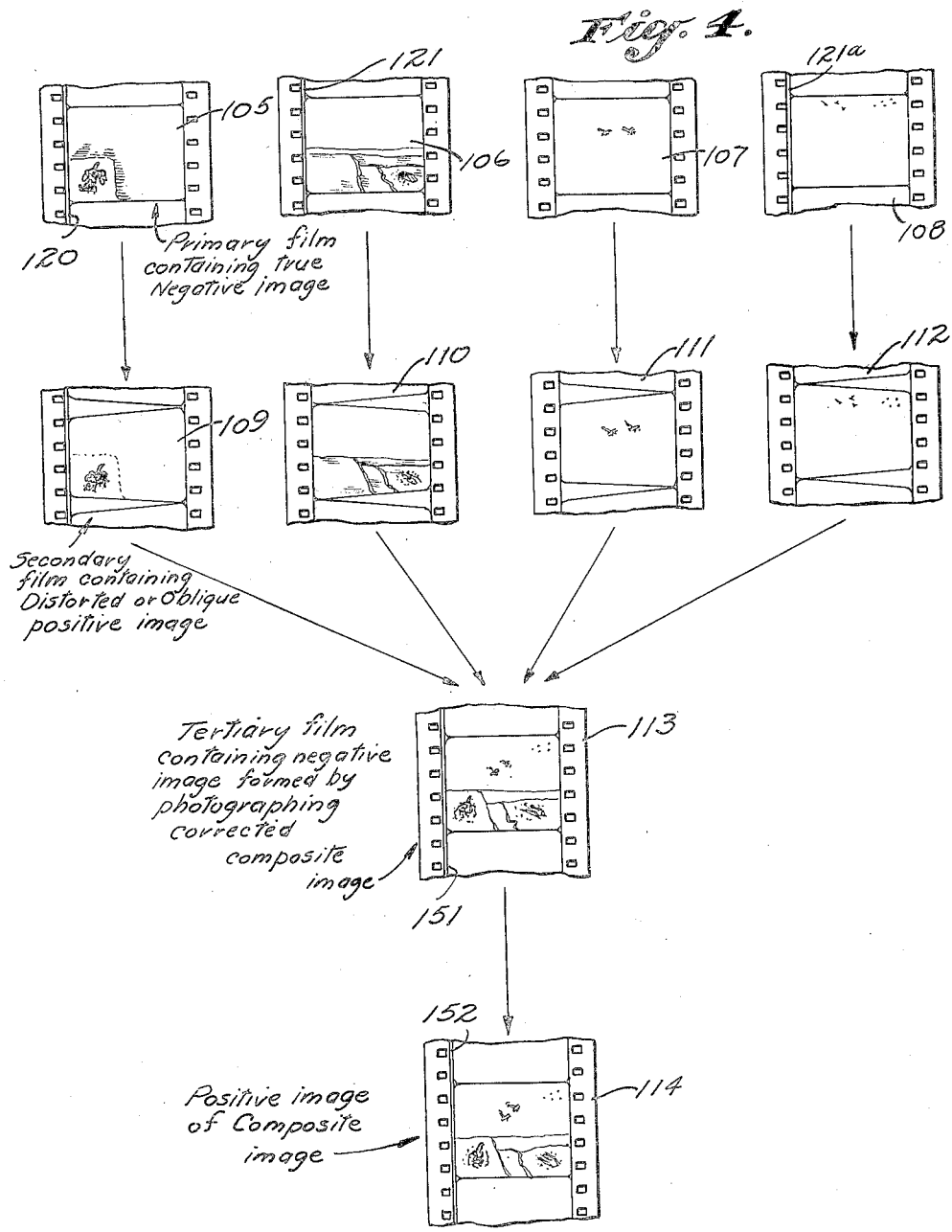

Patented Feb. 6, 1934

1,945,926

UNITED STATES PATENT OFFICE 1,945,926

METHOD OF AND APPARATUS FOR PRODUCING MOTION-PICTURES

Louis H. Tolhurst, Los Angeles, Calif.

Application October 13, 1928. Serial No. 312,262

10 Claims. (Cl. 88—16)

My invention relates to the photographic art, and more particularly to a novel method of producing composite images on a motion-picture film.

The production of motion-pictures frequently requires the use of miniature sets, due to the expense involved in building large, life-sized sets which are to be subsequently burned, blown up, or otherwise destroyed. In addition, certain types of scenes are best photographed by forming a miniature set and subsequently photographing this set to secure the desired effect.

In many instances it is desirable to form a composite image on a film, this image being formed by a plurality of properly matched individual images. Heretofore it has been necessary that each of these plurality of individual images be formed by photographing life-sized sets, due to the difficulty in correctly matching images of such life-sized sets with images of miniature sets. Furthermore, the number of images which it has been possible to accurately match into one composite image has been quite limited, the upper limit usually being two, and, under exceptional circumstances, three.

In any event, the production of composite pictures has been difficult due to the difficulty of correctly masking images as small as those formed by a motion-picture camera. My invention overcomes this difficulty and also eliminates the necessity of double or triple exposures heretofore necessary.

It is a primary object of this invention to provide a novel method and apparatus for combining a plurality of photographic images taken under different conditions in such a manner that a unitary image may be formed therefrom.

It is a further object of this invention to provide a method and apparatus for utilizing both miniature and life-sized sets or scenes in forming a composite image.

Another object of this invention is to provide a method of producing a composite image in which a large number of individual images may be accurately matched.

In carrying out this invention I have found it desirable to provide a composing screen on which the different images are projected and to photograph the composite image formed after properly matching the individual images.

It is an object of this invention to provide a composing screen adapted to receive a plurality of superimposed or adjacent images, and to subsequently photograph these images.

It thus becomes possible to focus a plurality of projectors on a single screen, and, by suitable manipulation, to form the projected images into a composite image which may be photographed in the usual manner.

When utilizing motion-picture projectors for projecting the images, and a motion-picture camera for photographing the unitary composite images as they are successively projected by the projectors, I have found it desirable to synchronize the shutter mechanisms of the projectors and the camera.

It is an object of this invention to provide a motion-picture projector and a motion-picture camera having synchronized shutter mechanisms, the projector being adapted to directly or indirectly form an image on the film passing through the camera.

It is desirable that the axis of the camera photographing the composite image be non-parallel relative to the axes of the projectors which form the individual images, especially where the camera and projector are on opposite sides of the screen. In accomplishing this result I have found it desirable to place the camera in such a position that the direction in which it points (hereinafter termed the camera axis) is perpendicular to the composing screen, while the direction in which the projectors point (hereinafter termed the projector axis) are non-perpendicular to the plane of the composing screen.

It is an object of this invention to provide a projector adapted to project an image, and a camera adapted to photograph this image, the axes of the camera and projector being non-parallel.

It is a further object of this invention to provide a method of forming composite images which includes the oblique projection of a plurality of images on a composing screen and the photographing of these images in a manner to form a composite picture, the axis of the camera being substantially perpendicular to the plane of the composing screen.

This arrangement makes desirable the use of an obliquely-photographed image in order that the composite image cast on the screen and photographed by the camera be undistorted. Such an obliquely-photographed image I have termed an oblique image, this image being one which may be produced either by correctly determining the angle of the camera relative to the set when producing the photographic image, or one which is preferably made by photographing a set in the ordinary manner, and subsequently transforming the image thus formed into an oblique image, this latter method making it possible to use stock films illustrating different scenes which are to appear on the composite picture.

An oblique image, as the term is used in this specification, is an image in which images of certain parallel lines appearing in the original scene or set would appear to converge on the image and could be again made parallel by projecting the oblique image on a screen which is non-perpendicular to the axis of the projector. This term is further illustrated in the subsequent descriptive matter.

It is an object of this invention to provide a method of forming composite images by obliquely projecting a plurality of oblique images in a manner to form a corrected composite image on a screen, which corrected image may be photographed.

A further object of this invention is to provide a method and apparatus for forming an oblique image from an ordinary photographic image.

My invention furthermore facilitates the use of miniatures in the projection of talking motion-pictures.

Thus, it is not necessary that only photographic images be utilized on the composing screen. Other images may be formed directly thereon, or a miniature set may be erected directly in front of a portion of the composing screen, this set being in the path of the camera and thus being photographed thereby together with the images projected on the composing screen.

It is an object of this invention to combine projected images with a miniature or other set or scene, and to simultaneously photograph the miniature with the projected images.

My method finds other utilities in the talking motion-picture art. One method of producing talking motion-pictures comprises controlling the amount of light reaching a sound track of a motion-picture film during the exposure of the film, this light being controlled by a suitable light-valve operated in response to undulations of the air accompanying the sound produced during the exposure of the film. Upon development, a sound image of varying density appears along the film. A positive film is then printed from the negative film, this positive film including the sound track of varying density. A beam of light is then sent through the sound track and the varying densities of this sound track varies the intensity of this beam of light prior to this beam being impinged on a photoelectric cell. The intensity of the light beam reaching the photoelectric cell determines the reproduction of sound, this sound being produced by a suitable reproducer connected in the electric circuit of the photoelectric cell.

It is a further object of this invention to provide a novel method of utilizing miniatures in the projection of talking motion-pictures.

Further objects and advantages of this invention will be made evident hereinafter.

Referring to the drawings, in which I have diagrammatically illustrated the method and apparatus of my invention,—

Fig. 4 is a diagrammatic view illustrating the preferred sequence of operations of my invention.

Fig. 5 is a diagrammatic view illustrating a set in my process of superimposing a plurality of sound records.

Figure 1:
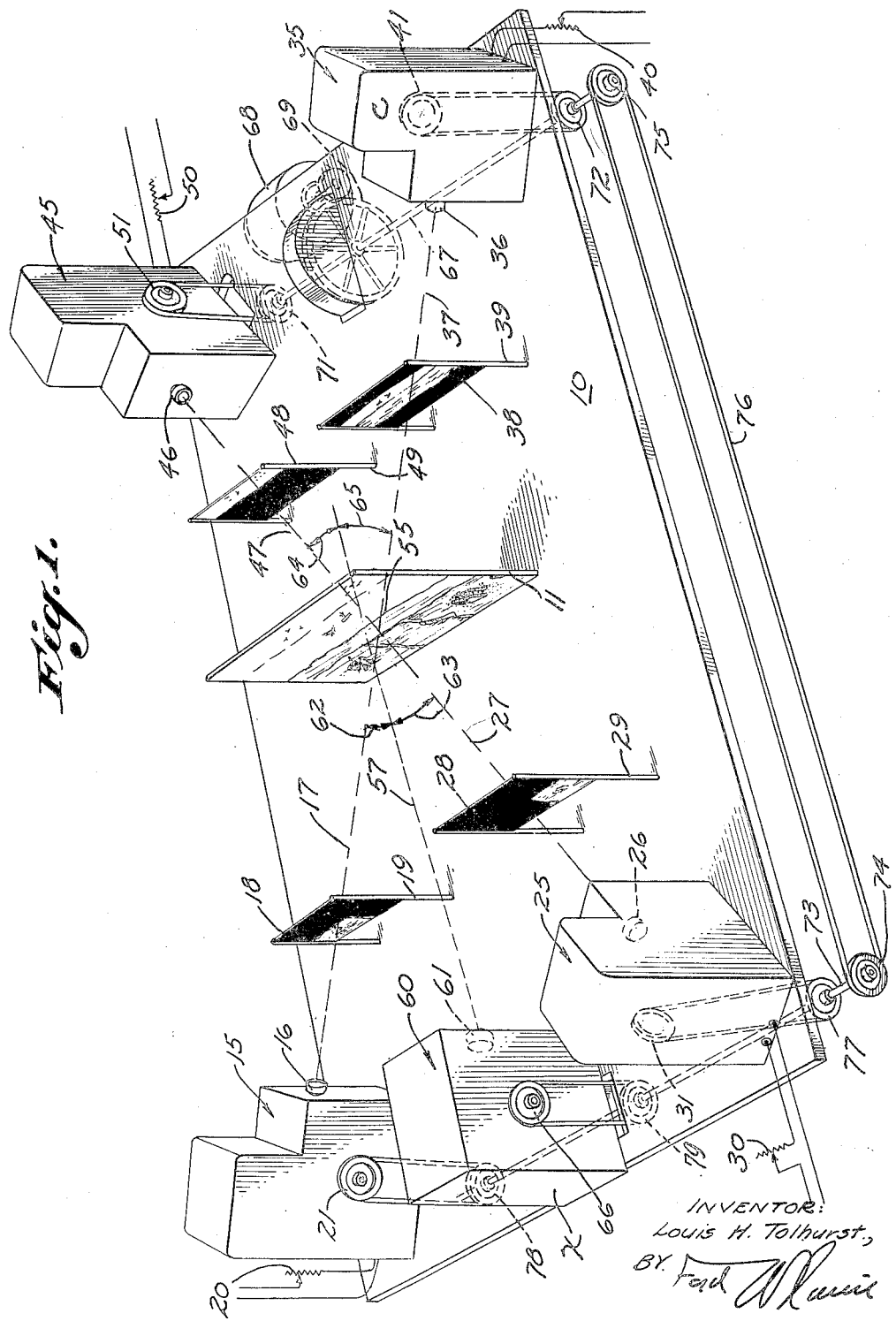
Fig. 1 is a perspective view illustrating the set-up of camera and projectors utilized in one step of my invention.

The invention may be best understood by referring to Fig. 1 which illustrates a table-top 10, in the central portion of which a composing screen 11 is secured. This composing screen is preferably formed of a sheet of glass ground on one side, or may be formed of any other material which will provide a translucent screen.

On one corner of the table-top 10 I have illustrated a motion-picture projector 15 having a lens 16, a central axis of which is indicated by the numeral 17, this axis also being termed the axis of the projector 15. Interposed in the path of the rays emanating from the projector 15 is a masking screen 18 mounted on standards 19, this screen being adapted to control the contour of the image projected on the composing screen 11 by the projector 15. For the purpose of controlling the brightness of the image formed on the composing screen, I have diagrammatically illustrated a rheostat 20 which is connected in series with the light source utilized in the projector 15. The projector 15 may be any one of a number of well-known types and is provided with an intermittently opening shutter mechanism operated by a pulley 21, this pulley also operating the film-advancing mechanism in any well-known manner, so that when the pulley 21 is turned, the projector 15 forms successive photographic images on the composing screen 11.

A similar projector 25 is positioned adjacent another corner of the table-top 10 and is provided with a lens 26 which is directed toward the composing screen 11 so as to provide an axis 27 similar to the axis 17. Interposed between the projector 25 and the composing screen 11 is a masking screen 28 supported on a suitable support 29. A rheostat 30 is provided which is similar in function to the rheostat 20. The projector 25 is similar to the projector 15 and is provided with a pulley 31 serving the same function as the pulley 21.

The projectors 15 and 25 are placed on the same side of the composing screen 11. In addition, a pair of projectors 35 and 45 are positioned on the opposite side of the composing screen, in a position illustrated in Fig. 1. The projectors 35 and 45 are identical with the projectors 15 and 25, and respectively include lenses 36 and 46 having axes 37 and 47, these axes being directed toward the composing screen 11. Masking screens 38 and 48 are interposed respectively between the projectors 35 and 45 and the composing screen 11, these screens being held in supports 39 and 49. The projectors 35 and 45 are respectively provided with rheostats 40 and 50 which control the brightness of the images projected onto the composing screen 11. The timing of these images being controlled by shutter and film-advancing mechanisms operated by pulleys 41 and 51 respectively.

The axes 17, 27, 37, and 47 have been illustrated as being horizontal, so that each of these axes passes through the horizontal central axis of the composing screen 11, and lie in the same plane. All of these axes preferably intersect in a single point 55 on the ground glass surface of the composing screen 11, the axes 17 and 37 being in axial alignment, and the axes 27 and 47 being in axial alignment as indicated in Fig. 1. This particular positioning of the axes is not essential to this invention as will be hereinafter brought out.

Also passing through the point 55 is an axis 57 of a motion-picture camera 60, this axis also being the central axis of a lens 61 formed on the camera 60. Furthermore, the axis 57 lies midway between the axes 17 and 27, and an extension of the axis 57 thus lies midway between the axes 37 and 47. The angle 62 formed between the axes 17 and 57 is thus equal to the angle 63 formed between the axes 57 and 27, and it also follows that the angles indicated by the numerals 64 and 65 are also equal to each other and equal to the angles 62 and 63. Any one of the angles 62 to 65 inclusive has been termed the angle of obliquity.

The details of the camera 60 are not a part of this invention, this camera being any one of a number of well-known types, and has a pulley 66 adapted to advance a motion-picture film therethrough and simultanenously operate a shutter mechanism.

For this purpose I have diagrammatically illustrated a drive shaft 67 journalled below the table-top 10 and driven by a constant speed motor 68 through a train of gears 69. Pulleys 71 and 72 are mounted on the shaft 67, these pulleys being respectively belted to the pulleys 51 and 41. Journalled under the other end of the table-top 10 is a counter-shaft 73 which is driven by a pulley 74 connected to a pulley 75 of the line shaft 67 by a belt 76. The counter-shaft 73 is provided with pulleys 77, 78, and 79 which are respectively belted to the pulleys 31 and 21 of the projectors 25 and 15 and to the pulley 66 of the camera 60.

Thus, by energizing the motor 68 the shutter mechanisms of all of the projectors are synchronized with each other and also with the shutter mechanism of the camera 60. In practice I prefer to use other devices for synchronizing these shutter mechanisms than the one shown, the one illustrated in the drawing being shown for illustrative purposes only.

Figure 2:
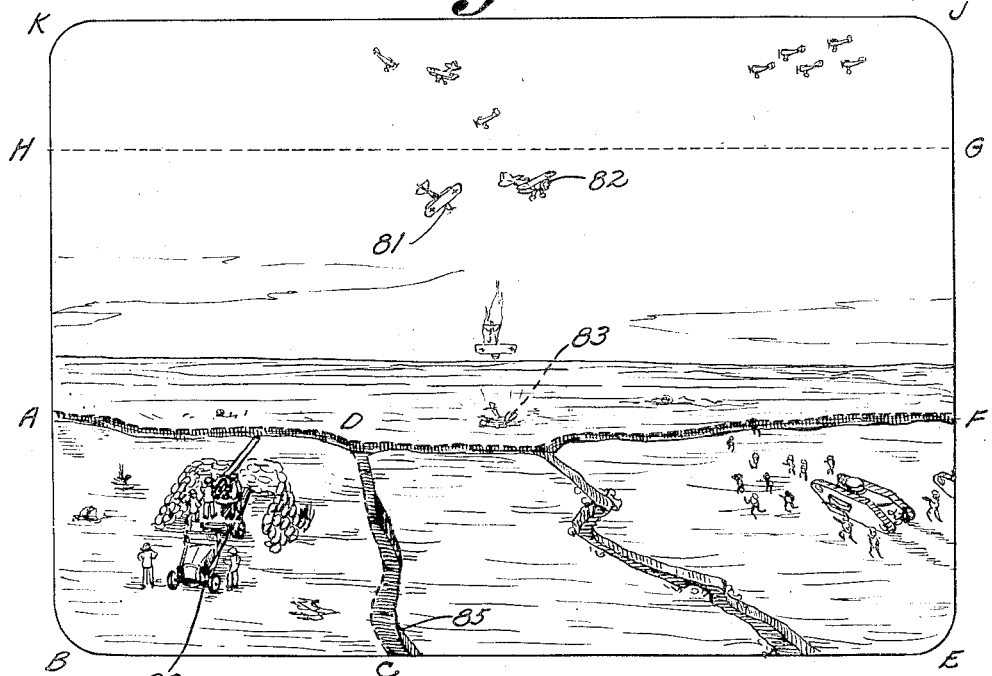
Fig. 2 is a typical composite image such as may be formed by the projectors illustrated in Fig. 1.

The projectors 15, 25, 35, and 45 are adapted to cooperate in forming a composite image on the composing screen 11, this image being photographed by the camera 60. For the purpose of illustration I have shown in Fig. 2 a typical composite image which may be formed by the apparatus illustrated in Fig. 1. Fig. 2 diagrammatically illustrates a war scene in which any anti-aircraft gun 80 appears in the lower left-hand corner of the picture, this gun being pointed at a plurality of planes appearing in the upper part of the picture.

I have illustrated that portion of the composite image including the anti-aircraft gun 80 and defined by the letters A—B—C—D, of Fig. 2 as being projected by the projector 15, the contour of the line A—D—C being determined by the contour of the opaque portion of the masking screen 18, as indicated in Fig. 1. That portion of the composite image illustrated in Fig. 2 which is bounded by the lines D—C—E—F is projected by the projector 25 and illustrates a group of soldiers advancing toward the center of the picture.

That portion of the picture bounded by the lines F—G—H—A illustrates an aerial combat in which a plane 81 is being shot down by an enemy plane 82, the plane 81 subsequently crashing to the ground at a point indicated by the numeral 83. This portion of the composite image is formed by photographing a miniature set, the planes 81 and 82 being miniature planes. In order to make the size of the planes 81 and 82 appear commensurate with the remainder of the composite image, the projector 25 which projects this portion of the image is correctly adjusted both as to position and lens focus so that the result appearing in Fig. 2 is obtained.

That portion of the composite image bounded by the letters G—H—K—J is projected from a film passing through the projector 45, this view illustrating a plurality of planes maneuvering in the air. The contour of the line H—G of the portion G—H—K—J is determined by the contour of the opaque portion of the masking screen 48, while the contour of the line H—G of the image bounded by the letters A—F—G—H is determined by a similar contour line formed by the opaque portion of the masking screen 38.

It should thus be apparent that by simultaneously projecting the images of the films in the respective projectors a composite image may be formed on the composing screen, and this composite image may be correctly matched by changing the contour of the opaque portions of the masking screens.

It is preferable, however, to match ground scenes along a relatively opaque line extending across the picture. Thus, the line A—D—C at which the three images A—B—C—D, E—F—D—C, and F—G—H—A are joined has been selected along a trench 85 because of the fact that such a trench would ordinarily present a rather opaque portion of the image due to the heavy shadows therein. It should be understood, of course, that I am not limited to the joining of the images on an opaque line, although this joining is ordinarily preferable in most scenes. Thus, in joining the portions F—G—H—A and G—H—K—J, the junction has been completed along the line G—H, this being made possible due to the clear sky appearing in both the miniature set and the upper scene including the plurality of airplanes.

The relative intensities of the images formed on the composing screen may be varied by means of the rheostats connected to the individual projectors so that the images formed by the respective projectors may be accurately matched both as to contour and as to intensity, the former matching step being performed by the masking screens and the latter by the intensity of the light utilized in projecting the images.

It should be clear, however, that I am not limited to a method of varying the intensities by means of varying the potential applied to the light source. This intensity may be varied by other methods, such as by interposing colored screens between the lenses and the composing screen, by placing iris diaphragms in the path of the rays passing through the lens or by changing the actinic properties of the light emanating from each lens, or reaching the composing screen from each lens.

Neither am I limited to the formation of a composite image by joining respective images on a single line. Thus, instead of making the blocked-off portions of the masking screens entirely opaque, it is entirely possible, and in many cases desirable, to blend the images together rather than dividing these images on a single line. This may readily be accomplished by controlling the density of the masking screens.

It is ordinarily impossible to axially align the axis of a projector and a camera when the projector and camera are placed on opposite sides of a screen. This is due to the rays of light which pass through the screen and which cause a halo on the composite image and a certain amount of halation and other distortion on the film in the camera 60. To overcome this difficulty the projectors are placed so that their axes are non-parallel to the axis of the camera, the placement illustrated in Fig. 1 being preferable in the preferred embodiment of my invention.

It is furthermore desirable that the most divergent ray passing through the lens 61 of the camera should not fall within the bounds of the rays projected by any projector. Furthermore, the masking screens 18 and 28 must be placed sufficiently far apart so as not to appear in the photographic image formed in the camera 60.

Due, however, to the fact that in this form of the invention the axes of the projectors are not perpendicular to the plane of the composing screen, it becomes necessary to devise some means for correcting the images which are projected onto the composing screen 11. If this is not done the perspective of the composite image is not correct. In accomplishing this end, I have found it desirable to utilize films in each of the projectors the images of which are distorted relative to the image which is projected on the composing screen 11.

Figure 3:
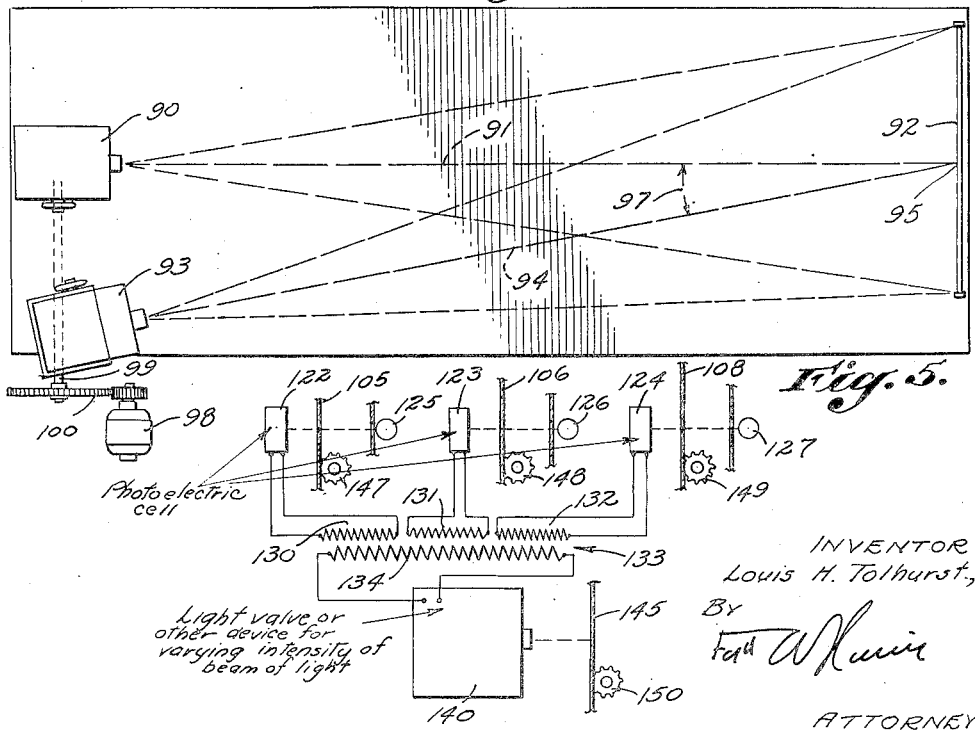
Fig. 3 is a diagrammatic view illustrating the method of forming oblique images.

The apparatus for forming the motion-picture films with suitably distorted images is illustrated in Fig. 3. Referring to this figure I have illustrated a projector 90 having an axis 91 directed perpendicularly toward a screen 92, this screen being of a translucent character.

To one side of the projector 90 is a camera 93 having an axis 94 which intersects the axis 91 at a point 95 lying on the screen 92. Thus, the camera obliquely photographs the image thrown on the screen 92 by the projector 90. It is desirable to make the angle 97 formed between the axes 91 and 94 equal to the angle of obliquity of the apparatus illustrated in Fig. 1. In other words, the angle 97 should equal any of the angles 62 to 65 inclusive. In any event, it is desirable that the angle 97 be equal to the angle of obliquity between the axis 57 and the axis of the projector which is to project the film being exposed in the camera 93.

The details of the camera and projector are not a part of this invention, but it is desirable that the shutter mechanisms on these pieces of apparatus be synchronously driven. This may be accomplished by mechanism such as illustrated in Fig. 1 or by other means. I have illustrated a motor 98 connected to a shaft 99 by a suitable gear train 100, the shaft 99 being operatively connected to the shutter and film-advancing mechanisms of the projector 90 and camera 93 so that both shutters are simultaneously opened and simultaneously closed.

The method of my invention may best be understood by reference to Fig. 4 which diagrammatically illustrates the preferred sequence. In this sequence, four sets of negative films are photographed in the usual manner, these films being numbered 105 to 108 respectively, and having images thereon which respectively correspond to those portions of the composite image formed by the projectors 15, 25, 35, and 45.

Each of the films 105 to 108 is individually sent through the projector 90 of the distorting apparatus llustrated in Fig. 3 with the result that distorted or oblique positive images 109 to 112 are produced, these images being distorted in a manner illustrated in Fig. 4, those edges of the frames which are transverse relative to the film being non-parallel.

In some instances it is necessary to place the camera 93 in a position so that its axis lies on the other side of the axis 91 of the projector 90 so that the images may be distorted in the correct direction. This saves reversing the position of the film in passing through the projector 90 as would otherwise be necessary on certain of the films so as to secure an image of corresponding perspective from all of the projectors 15, 25, 35, and 45 when forming the composite image.

These distorted or oblique positive films are respectively placed in the projectors 15, 25, 35, and 45, and a composite image is formed on the composing screen 11. This composite image will be of correct perspective, due to the fact that the angle of obliquity between the axis of the camera and projectors in the apparatus illustrated in Fig. 1 is the same as the angle 97 illustrated in Fig. 3. This composite image is photographed by the motion-picture camera 60 so as to form a negative film indicated by the numeral 113 of Fig. 4. This negative film is subsequently printed so as to form a positive film 114 in any well-known manner, this positive film containing images which, when projected, form an apparently moving image which in fact is a composite of all of the images formed on the films 105 to 108.

It is, of course, to be understood that it is not necessary that the successive images formed on the composing screen by any one projector be images which are apparently in motion. Thus, it is entirely possible to permanently form a certain portion of the scene on the composing screen, this being done either by projecting one or more images continuously or intermittently thereon, by placing a photographic image on the masking screen through which light is projected, or by permanently painting a portion of the scene on a composing screen.

Furthermore, it is sometimes desirable to erect a miniature set on the camera side of the composing screen, this set taking the place of the projected image falling in one of the zones of the composite image. This miniature set may be erected on the table-top 10 and must, of course, lie in the path of the camera so as to be photographed thereby. The projected images may be very easily matched with the miniature in this case by blocking off the desired outline on the masking screens. The oblique projection in this case is also advantageous, for by blocking-off on the masking screen in front of the composing screen the outline of the miniature, the rays of light may pass back of the miniature and impinge on the composing screen at a point back of the miniature when looking in the direction in which the camera 60 points. The projectors 35 and 45 positioned on the opposite side of the screen from the camera may or may not be used, depending upon circumstances. If desired these projectors may be utilized for forming a single or composite image on the composing screen, and the position of the miniature set adjusted to match up with this projected image. It thus becomes possible to simultaneously photograph a plurality of effects to form a composite image, these effects being either painted on the composing screen to form an image thereon, projected on the screen by photographic means, or being in the form of one or more miniatures positioned in front of the composing screen.

Similarly, my invention also comprehends the placing of one or more composing screens in a miniature set, and projecting on these screens a series of images apparently in motion, which projected images may be simultaneously photographed with the miniature set. Thus a miniature set of a mountain might be built with a space cut therefrom to conform to the shape of the outlet of a railroad tunnel, a ground glass being positioned in this space. An image of a train running on suitable tracks might be projected on this ground glass so that the camera would photograph the net image of a mountain and a train emerging from a tunnel thereof.

Furthermore, it is not necessary to use the synchronous drive for the camera and projectors. Each individual set of frames projected simultaneously by all the projectors may be carefully composed to form a composite image, and the shutter of the camera 60 then opened for the correct exposure. This composing is, of course, done by correctly adjusting the relative brightness of the images formed by the individual projectors and by correctly matching these images, this matching being most easily done by changing the outlines of the opaque portions of the masking screens, these screens due to their relatively large size, making such matching an easy task.

The placement of the images on the primary and secondary films is ordinarily immaterial inasmuch as slight changes in position may be effected by adjusting the position of the projectors 15, 25, 35, and 45 without materially distorting the composite image.

Furthermore, it is not necessary to use the exact number of projectors illustrated in Fig. 1, the number of projectors varies with the number of sections or zones desired in the composite image, and my invention comprises the utilization of any number of these projectors whether more or less than four. If more than four projectors are to be utilized, it is desirable that the axes of the additional projectors be out of the horizontal plane including the axes 27, 37, 47, and 57, although it is possible to include the new axes in this plane by changing the angle of obliquity between these axes and the axis 57.

In the event that the new axes are not in this horizontal plane, it is desirable to maintain the angle of obliquity constant, and to position the projectors directly above and below the axis 57, or in the locus of a line passing through the point 55 and revolving around the axis 57 at a constant angle of obliquity, this theoretical line thus defining a conical path. If more than four projectors are utilized, and this method is followed, it is, of course, necessary to change the relative position of the projector 90 and camera 93 illustrated in Fig. 3. Thus, if a projector were placed directly above the camera 60 in the apparatus illustrated in Fig. 1 and pointed downward toward the screen 11, it would be necessary to move the camera 93 above the projector 90 in order that the images on the secondary film be correctly distorted.

In the production of talking motion-pictures it is often desirable to superimpose sound records so that when the film is projected sounds which were separately recorded may be simultaneously reproduced. This is especially true when composite images are being formed. Thus, in projecting the particular composite image illustrated in Fig. 2, it is desirable that the sounds produced during the filming of certain or all of the original scenes or sets be simultaneously reproduced. This, I accomplish by recording on the primary films 105, 106, and 108 any sounds produced during the exposing of these films. Thus, sound tracks 120, 121, and 121a are respectively formed on these films, each sound track being of varying density throughout its length and being formed by a beam of light the intensity of which varies in response to the undulations of the air accompanying the sound to be recorded. The particular method of producing this beam of varying intensity is not a part of this invention.

Referring particularly to Fig. 5, I have illustrated the films 105, 106, and 108 as being simultaneously moved past respective photoelectric cells 122, 123, and 124 so that beams of light emanating from sources 125, 126, and 127 may impinge on these photoelectric cells after these beams have been respectively passed through the sound tracks of the films 105, 106 and 108, these sound tracks varying the intensity of these beams.

The electrical circuits of each of these photoelectric cells are respectively connected to individual primary windings 130, 131, and 132 of a transformer 133 having a single secondary winding 134 which is inductively connected to all of the primary windings 130, 131, and 132. Each of the photoelectric cells is influenced by the beam of light striking it, and produces in the primary winding to which it is connected a pulsating current varying proportionately to the undulations of the air accompanying the sound record on the sound track which influences the beam of light striking this particular photoelectric cell. The net effect of the currents controlled by the individual photoelectric cells 122, 123, and 124 is to induce in the secondary winding 134 of the transformer an electromotive force varying in response to the summation of the undulations of the air produced by the original sounds recorded on the films 105, 106, and 108. A suitable light-valve 140, or other device, for controlling the intensity of a beam of light in response to the undulations of the current passing therethrough is connected to the secondary winding 134 so that the varying electromotive force induces in this winding, or control, a current passing through the light-valve 140.

The beam of light produced by the light-valve 140 may be impinged on the sound track of a film 145 moving synchronously with the films 105, 106, and 108. This synchronous movement of the films 105, 106, 108, and 145 is accomplished by sprockets 147 to 150 inclusive, these sprockets being synchronously driven in any well-known manner.

The film 145 may be the positive film indicated by the numeral 114 in Fig. 4, but in this event it is necessary to run the films 105, 106, and 108 each time a positive is to be printed. It is therefore desirable that the film 145 be an individual film, this film being subsequently utilized to print a sound track 151 on the tertiary negative film 113, this sound track being subsequently printed on the positive film 114 as indicated by the numeral 152 of Fig. 4. In this preferred sequence, the film 113 represents a true negative both as to the composite images and as to the sound record formed thereon. It should, of course, be understood that by making the intensity of the beams of light originally utilized for recording sound tracks on the films 105, 106, and 108 vary in an inverse relationship relative to the undulations of the air, rather than a direct relationship, such a system of films might be simultaneously passed through the apparatus illustrated in Fig. 5 and utilized for forming the sound track directly on the film 113. In other words, the ordinary method of photographically recording sound is to impress a negative sound record on the original film, this record being subsequently printed into a positive sound record appearing on the film to be projected. By making the original sound record on the negative film a positive sound record rather than a negative record, such a record may be directly transferred to the negative film 113.

It should be understood that I am not limited to the use of photoelectric cells, any device which produces or varies an electric current in proportion to the variations of a beam of light may be utilized instead. Similarly, any device which directly or indirectly varies the intensity of a beam of light in response to a varying electromotive force, or a pulsating or alternating current may be utilized in place of the light-valve 140. The transformer 133 is preferably of the air-core type, although I am not limited to this particular type of transformer.

In Fig. 5, no sources of potential have been shown, the positioning of such sources of potential in the circuits of photoelectric cells and light-valves being well-known in the art.

It will be noted that the film 107 which was used for photographing the miniature set does not carry a sound track. Ordinarily, there is produced during the exposing of this film no sounds which are especially desirable to record. However, special sound effects may be recorded on this film either during or subsequent to the exposure thereof, and this record superimposed on the sound records of the other films by the use of another photoelectric cell or an equivalent device connected to an additional primary winding of the transformer 133.

I claim as my invention:

1. A method of producing a composite image on a film, which comprises: projecting a pair of oblique images on a composing screen in a manner to form corrected images thereon; blocking off overlapping portions of the individual images formed by said oblique images to form a corrected composite image; and photographing said corrected composite image.

2. A method of producing a composite image on a film, which comprises: projecting a pair of oblique images on a composing screen in a manner to form corrected images thereon; adjusting the relative brightness of the individual images formed by said oblique images; blocking off overlapping portions of the individual images formed by said oblique images to form a corrected composite image; and photographing said corrected composite image.

3. In combination: a composing screen; a motion picture camera directly in front of said composing screen and focused thereon; a projector means comprising a pair of projectors on opposite sides of said camera at least one of said projectors being a motion-picture projector; means for synchronously operating said projector means and said camera; and film means in each of said projectors said film means carrying distorted images, said projectors being disposed at such angles relative to said screen that the images projected thereon by said projectors are corrected images.

4. A method of producing a composite image on a film by the use of two foundation images on separate films, which method includes the steps of: directing light rays through one of said foundation images and obliquely toward a composing screen whereby a projected image corresponding to said one of said foundation images is formed on said composing screen; directing light rays through the other of said foundation images and obliquely toward said composing screen whereby a projected image corresponding to said other of said foundation images is formed on said composing screen, said projected images on said composing screen overlapping; matching one of said projected images with respect to the other by intercepting the light rays forming at least one of said projected images, these rays being intercepted at a section between this projected image and the corresponding foundation image; and subsequently photographing the images on said composing screen in a direction oblique to said light rays forming either of said projected images.

5. A method of producing a composite image on a film by the use of two foundation images on separate films, which method includes the steps of: directing light rays through one of said foundation images and obliquely toward a composing screen whereby a projected image corresponding to said one of said foundation images is formed on said composing screen; directing light rays through the other of said foundation images and obliquely toward said composing screen whereby a projected image corresponding to said other of said foundation images is formed on said composing screen, said projected images on said composing screen overlapping; matching one of said projected images with respect to the other by intercepting the light rays forming at least one of said projected images, these rays being intercepted at a section between this projected image and the corresponding foundation image; subsequently photographing the images on said composing screen in a direction oblique to said light rays forming either of said projected images; and adjusting the relative brightness of said projected images.

6. In combination: a composing screen; a plurality of projectors directing light rays obliquely toward said composing screen; image means in said projectors for forming projected images on said composing screen; a masking screen between at least one of said projectors and said composing screen and intercepting certain of the light rays forming one of said projected images to match this projected image with respect to the other projected image or images; and a camera providing a lens focused on said composing screen but out of the field of the light rays of said projectors, said masking screen being out of the field of said lens of said camera.

7. In combination: a composing screen including a primary image thereon; a projector directed toward said composing screen and projecting light rays impinging thereon to form a secondary image which tends to overlap said primary image; a masking screen positioned between said projector and said composing screen and in the path of said light rays, a portion of said masking screen being darkened and intercepting said light rays to match said secondary image with respect to said primary image, thereby forming a composite image; and a camera directed toward said composing screen and including a lens positioned out of the direct light rays from said projector passing through said masking screen, whereby none of said direct light rays enter the field of said lens, said masking screen being positioned out of the field of said lens of said camera whereby said camera can photograph said composite image without interference from said masking screen.

8. A method of producing a composite image on a film by the use of two foundation images on separate films, which method includes the steps of: simultaneously projecting onto a composing screen said two foundation images to form two projected images on said composing screen; matching said projected images by manually blocking out complementary portions of each projected image during the time that said images are simultaneously projected, thereby forming a composite image on said composing screen, said manual blocking out being performed at a section between said composing screen and the individual foundation images; and photographing said composite image.

9. A method of producing a composite image on a film by the use of two foundation images on separate films, which method includes the steps of: simultaneously projecting onto a composing screen said two foundation images to form two projected images on said composing screen; matching one of said projected images with respect to the other by intercepting the light rays forming said one of said projected images at a section between this projected image and the corresponding foundation image and during the time that both of said foundation images are being projected onto said composing screen; and subsequently photographing the images on said composing screen to form said composite image on said film.

10. In combination: a composing screen; a camera directly in front of said composing screen and providing a lens through which said composing screen may be photographed; a pair of projectors on the same side of said composing screen as said camera and respectively directing light rays obliquely toward said composing screen, said light rays forming two projected images thereon which tend to overlap; and a pair of masking screens, one masking screen being positioned to intercept the light rays from each projector, each masking screen being positioned out of the field of said lens of said camera, said masking screens being darkened to match said projected images to form a composite image photographed by said camera.

LOUIS H. TOLHURST.